(12) United States Patent
Amtmann

(10) Patent No.: US 8,198,984 B2
(45) Date of Patent: Jun. 12, 2012

(54) METHOD, RFID READER, RFID TAG AND RFID SYSTEM FOR SECURE COMMUNICATION

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 836 days.

(21) Appl. No.: 12/304,315

(22) PCT Filed: May 15, 2007

(86) PCT No.: PCT/IB2007/051840
§ 371 (c)(1),
(2), (4) Date: Dec. 11, 2008

(87) PCT Pub. No.: WO2007/144798
PCT Pub. Date: Dec. 21, 2007

(65) Prior Publication Data
US 2009/0251289 A1 Oct. 8, 2009

(30) Foreign Application Priority Data

Jun. 13, 2006 (EP) ..................................... 06115373

(51) Int. Cl.
*H04Q 5/22* (2006.01)
(52) U.S. Cl. ..................................................... 340/10.1
(58) Field of Classification Search ................... 340/9.1, 340/10.1, 10.2; 713/193
See application file for complete search history.

(56) References Cited

U.S. PATENT DOCUMENTS

| | | | | |
|---|---|---|---|---|
| 5,686,902 A * | 11/1997 | Reis et al. | ..................... | 340/10.2 |
| 7,362,212 B2 * | 4/2008 | Burghard et al. | ............ | 340/10.2 |
| 2003/0102979 A1 * | 6/2003 | Jednacz et al. | ........... | 340/825.52 |
| 2003/0145216 A1 * | 7/2003 | Nakane et al. | ................ | 713/193 |
| 2005/0058292 A1 | 3/2005 | Diorio et al. | | |

FOREIGN PATENT DOCUMENTS

| | | |
|---|---|---|
| EP | 0467036 A2 | 1/1992 |
| GB | 2277850 A | 11/1994 |
| JP | 11-149532 A | 6/1999 |
| JP | 2000-036015 A | 1/2000 |

\* cited by examiner

*Primary Examiner* — Brian Zimmerman
*Assistant Examiner* — Kaleria Knox

(57) ABSTRACT

In an RFID system a method for communication between a reader (1) and a tag (2) comprises: at the reader (1), switching on an electromagnetic signal (SS) for energizing the RFID tag (2) and/or transmitting an instruction (INST, RNREQ) or first data (D1) to the tag (2); at the tag (2), generating a random number (RN), converting said random number (RN) into a random time period (tx) and transmitting a response to the reader (1) after a delay time that corresponds to the random time period (tx); at the reader (1), measuring the random time period between transmitting the instruction (INST, RNREQ) or first data (D1) to the tag (2), receiving the response (RESP) from the tag (2), reconverting the measured random time period (tx) into the random number (RN), encrypting second data (D2) with the random number (RN) and transmitting said encrypted data (ED) to the tag (2); at the tag (2), decrypting the encrypted data (ED) by the use of the random number (RN).

17 Claims, 2 Drawing Sheets

METHOD, RFID READER, RFID TAG AND RFID SYSTEM FOR SECURE COMMUNICATION

FIELD OF THE INVENTION

The present invention generally relates to Radio Frequency Identification (RFID). More particularly, the present invention relates to a method for secure communication between a reader and a tag in an RFID system. The invention further relates to an RFID reader. The invention further relates to an RFID tag. The invention further relates to an RFID system.

BACKGROUND OF THE INVENTION

Radio Frequency Identification (RFID) systems are widely used for identifying and tracking items, inventory control, supply chain management, anti-theft of merchandise in stores, and other applications. A typical RFID system consists of a plurality of transponders (hereinafter referred to as "RFID tags" or simply as "tags") and one or more transceivers (hereinafter referred to as "RFID readers" or simply as "readers"). A reader interrogates one or more of the tags over a wireless forward link. The tags respond to the reader's interrogations by transmitting tag information back to the reader over a wireless return link.

A tag is usually embodied as a semiconductor microchip having a small amount of memory for storing the tag's ID number and, in some applications, information concerning the item to which the tag is associated. Further, tags are either "passive" or "active", depending on how they are powered. An active tag contains its own on-board power source, i.e. a battery, which the tag uses to process received signals and to transmit tag information back to a reader. A passive tag does not have its own on-board power source. Rather, it derives the power it needs by extracting energy from the RF carrier signals broadcast by the reader. The passive tag transmits information to the reader using a process known as load modulation for inductive systems or backscattering for wave propagation systems. A battery assisted tag contains its own on-board power source, i.e. a battery like an active tag, which the tag uses to process received signals and to power the digital circuit and the memory, whereby it transmits information back to the reader using the same principles as passive tags. Passive tags have, in many applications, become more popular than active tags, since they are less expensive to manufacture, to maintain, and to operate.

Because passive tags do not have their own power sources, and rely on backscattering, they cannot be read from great distances, although the distances greatly vary with the frequency band within which they are operated. For instance, when the passive tags are operated within the UHF frequency band, the reading distances may reach a few hundred meters. More specifically, passive tags at UHF frequencies reach 6-10 m, battery assisted tags up to 300 m.

On the other hand, RFID readers radiate signals with a tremendously higher transmitting power than the RFID tags. The difference in transmitting power between the reader and the tag is for instance about 100 dB. Hence, information emitted by RFID readers being operated in the UHF frequency range can be intercepted at a distance of more than 100 km.

It will be appreciated that such RFID systems are subject to a number of privacy and security risks. These security risks can arise during polling, singulation, and following singulation when a reader is communicating one-on-one with a particular tag. Without adequate access control, unauthorized (i.e. "rogue") readers may be able to interrogate tags or intercept information, which would otherwise remain secret.

In addition to the security concerns described, RFID systems without proper security and privacy measures in place undesirably allow unauthorized "location tracking". Unauthorized location tracking allows one or more readers to track RFID-labeled items (e.g. clothing worn by an individual or items an individual may be carrying such as tagged smart cards, credit cards, banknotes, etc.). Consequently, without proper access control or prevention measures in place, the privacy normally taken for granted concerning an individual's movement, social interactions and financial dealings can be compromised by RFID systems.

Various proposals for addressing the security and privacy risks associated with RFID systems have been proposed. One technique that has been proposed to avoid unauthorized access to readers and tags of an RFID system is "symmetric encryption". According to this technique, special encryption and decryption hardware is built into both the readers and the tags of the RFID system. A drawback of the symmetric encryption approach, however, is that a large number of logic gates is required to implement the encryption and decryption hardware. This increases the size and complexity of the microchip embodying the tag. Consequently, symmetric encryption is not a technique that allows the manufacture of small and inexpensive tags. For at least this reason, therefore, symmetric encryption is not a favorable solution to RFID risks.

Another technique that has been applied to avoid the security and privacy concerns described above is a technique known as "public-key" encryption. Use of public-key encryption permits a tag to transmit encrypted information, together with a public key known by both the reader and the tag, to the reader. The reader, having a private key known only to it, is then able to decrypt the information communicated by the tag. Unfortunately, similar to the symmetric encryption approach, public-key encryption requires a large number of logic gates to implement the encryption hardware. Accordingly, for reasons similar to that associated with the use of symmetric encryption, public-key encryption is not a simple and cost-effective approach to address RFID risks.

In order to overcome the above mentioned security drawbacks of RFID systems, US 2005/0058292 A1 discloses a method and an apparatus for providing secure two-way (reader-to-tag and tag-to reader) RFID communications. According to one aspect, a tag receives a noise-encrypted RF carrier signal from a reader and backscatter-modulates it with tag information. Eavesdroppers cannot extract the tag information from the backscattered signal because it is masked by the noise encryption. According to another aspect of this proposal, establishing a secure two-way RFID communication link includes a reader modulating a carrier signal with a noise encryption signal and broadcasting the noise-encrypted carrier to a singulated tag. The tag backscatter-modulates the noise-encrypted carrier with a first portion of a key and/or a one-time pad pseudo-random number. If a key is used, upon receiving the backscattered signal the reader verifies whether the tag is authentic, and, if verified as authentic, a second portion of the key is transmitted to the tag, the portion possibly encrypted by a function depending on the one-time pad pseudo-random number.

The known method and device, however, have shown the disadvantage that it has not yet been proved that noise-encryption of RF carrier signals suffices to guarantee that the information contained in the backscattered signal is fully masked by the noise encryption so that it cannot be extracted by an eavesdropper. Hence, there is still a necessity to improve the security of transmitting sensitive data in RFID systems, matched with the need for providing cost-effective RFID components.

OBJECT AND SUMMARY OF THE INVENTION

It is an object of the invention to provide a method of the type defined in the opening paragraph, an RFID reader, an RFID tag and an RFID system, in which the disadvantages defined above are avoided.

In order to achieve the object defined above, with a method according to the invention characteristic features are provided so that a method according to the invention can be characterized in the way defined below, that is:

A method for communicating securely between a reader and a tag in an RFID system, the method comprising:

at the reader, switching on an electromagnetic signal for energizing the RFID tag and/or transmitting an instruction or first data to the tag;

at the tag, generating a random number, converting said random number into a random time period and, when receiving the instruction or first data from the reader, transmitting a response to the reader after a delay time that corresponds to the random time period;

at the reader, measuring the time period between said switching on of the electromagnetic signal or said transmitting of an instruction or first data to the tag and receiving of the response from the tag, which time period corresponds to the random time period, reconverting the measured random time period into the random number, encrypting second data to be sent to the tag by the use of the random number and transmitting said encrypted data to the tag;

at the tag, decrypting the received encrypted data by the use of the random number.

In order to achieve the object defined above, with an RFID reader according to the invention characteristic features are provided, so that an RFID reader according to the invention can be characterized in the way defined below, that is:

An RFID reader, being operable:

to switch on an electromagnetic signal for energizing an RFID tag and/or to transmit an instruction or first data to an RFID tag;

to measure the time period between said switching on of the electromagnetic signal or said transmitting of an instruction or first data to the tag and receiving of a response from the tag, wherein the measured time period corresponds to a random time period;

to reconvert the measured random time period into a random number;

to encrypt second data to be sent to the tag by the use of the random number;

and to transmit said encrypted data to the tag.

In order to achieve the object defined above, with an RFID tag according to the invention characteristic features are provided so that an RFID tag according to the invention can be characterized in the way defined below, that is:

An RFID tag being operable:

to generate a random number;

to convert said random number into a random time period, when being energized by an electromagnetic signal or when receiving an instruction or first data from an RFID reader, to transmit a response to the reader after a delay time that corresponds to the random time period; and to decrypt received encrypted data by the use of the random number.

In order to achieve the object defined above, an RFID system according to the invention comprises an RFID reader and at least one RFID tag as defined above.

The core idea behind the present invention is that an eavesdropper who positions a receiver within the transmitting range of the RFID tag will also receive the signals emitted from the RFID reader having a transmit power that is in order of magnitudes higher than that of the RFID tag, wherein a difference in transmit power typically lies in a range of 100 dB. Presently, it is not possible to design a low distortion receiver such that is copes with signal strengths differing in a range of 100 dB and more. Hence, when designing the receiver such that it is sensitive enough to receive the signals of the return link, i.e. the signals transmitted by the RFID tag, such a receiver will inevitably overamplify the signals received from the reader, thereby causing heavy signal distortions. Signal distortions, in turn, result in changes of the group delay time, thereby making it impossible to carry out exact signal time measurements. Thus, information that is masked in signal time delays cannot be extracted by the eavesdropper.

The above described problem with overamplified signals, however, does not apply to the reader, since it is specifically designed to receive the weak signals of the tag. What is more, the reader exactly knows the time when it has sent first data or instructions to the tag, so it does not depend on interrogating the signals transmitted by itself.

According to another aspect of the invention, the random number is generated at the tag by the use of a pseudo-random number generator, providing the opportunity to newly generate random numbers in a one-time pad manner for each data to be communicated between the reader and the tag. This provides the advantage of higher security in communication.

In another embodiment of the present invention, the tag delays a response to the reader by the random time period only if it receives a specific instruction from the reader, whereas if no such specific instruction is sent, the tag will respond to requests of the reader without any time delay. This embodiment of the invention can be used to restrict the highly secure communication between the reader and the tag to specific procedures, such as authentication processes.

Alternatively to the aforesaid embodiment of the invention, the tag may delay each response to the reader by a random time period that is newly calculated for each response. Such an embodiment is adapted for encrypting all data that are communicated between the reader and the tag and vice versa by applying a highly secure one-time pad procedure wherein each random number is only used once. The tag can be configured such that on every reception of data or instructions from the reader it replies by sending a response, being it a response that contains payload data or merely a dummy response.

In order to keep the calculation efforts for converting the random number into a random time period and reconverting the random time period into the random number low and the calculation speed high, it is proposed to convert the random number into a random time period by multiplying the random number with a predefined time unit. Correspondingly, the random time period is reconverted into the random number by dividing the random time period by the predefined time unit. The time unit has to be chosen not too small such that external signal group delay variations will not lead to wrong reconverting results.

An alternative and fast solution for converting the random number into a random time period and reconverting the random time period into the random number is to provide a table that contains pairs of random numbers and associated random time periods. Each time, when the tag has to convert a random number into a random time period it looks up for the random time period in the table by using the random number as an index. Each time, when the reader has to convert a random time period into a random number it looks up for the random number in a corresponding table by using the random time period as an index.

In order to speed up processing in the tag in yet another embodiment of the invention, the tag generates random numbers autonomously and independently of receiving an instruction or first data from the reader. This means that the tag always has a random number "in stock" such that, when it receives a request from the reader, it can immediately proceed to transmit a response after a delay time that corresponds to the random number in stock. For even faster processing it might be useful to generate not only the random number in an idle mode of the tag, but also to calculate and to store the corresponding random time period.

It should be noted that the features of the inventive method can be directly implemented in the device.

The aspects defined above and further aspects of the invention will become apparent from the exemplary embodiment to be described hereinafter and are explained with reference to this exemplary embodiment.

The invention will be described in more detail hereinafter with reference to an exemplary embodiment. However, the invention is not limited to this exemplary embodiment.

DESCRIPTION OF EMBODIMENTS

Figure 1:
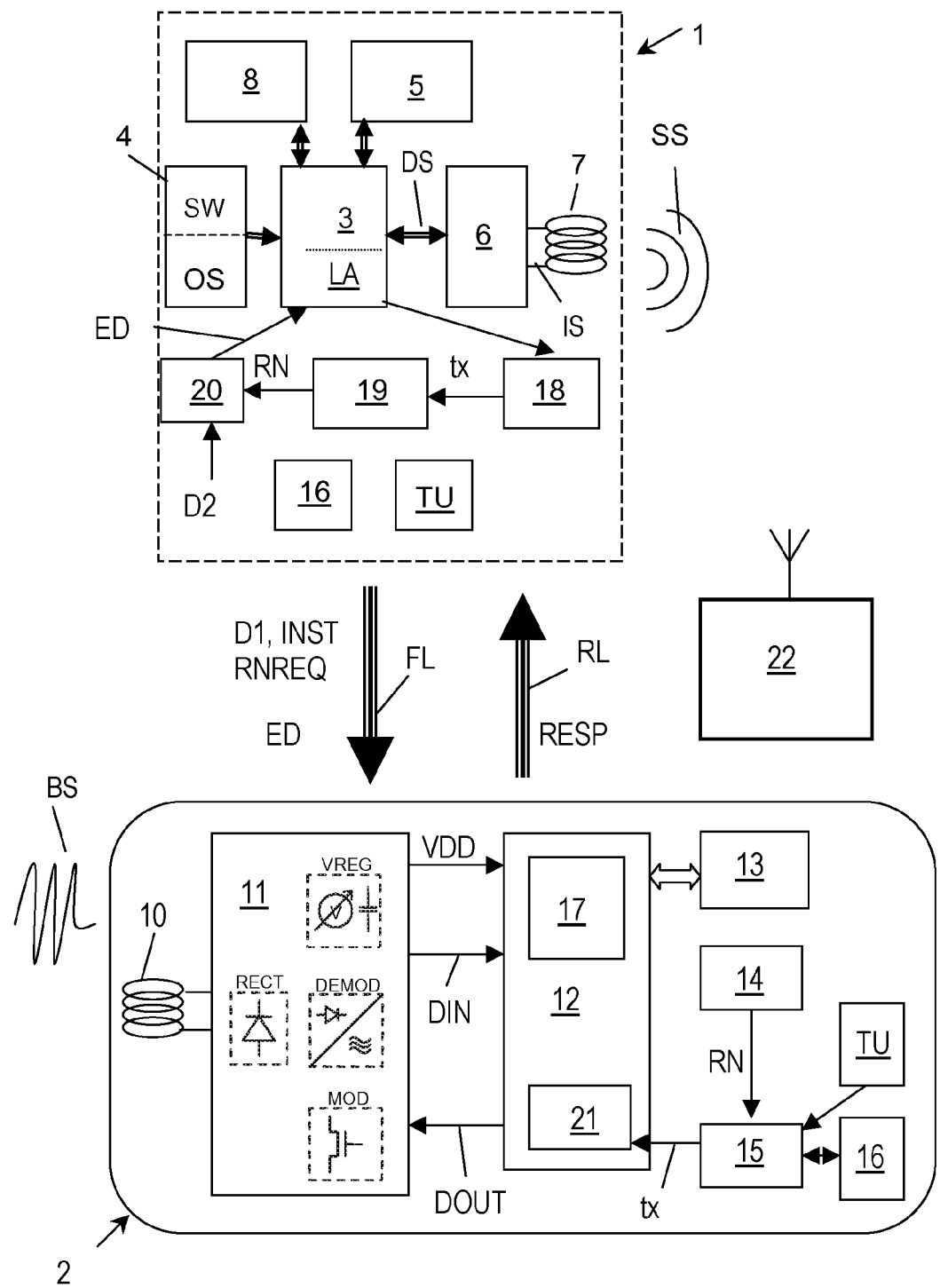
FIG. 1 shows a schematic block circuit diagram of an RFID system according to the invention, comprising an RFID reader and an RFID tag.

FIG. 1 shows a schematic block circuit diagram of an RFID (Radio Frequency Identification) system comprising an RFID reader 1 and an RFID tag 2. The RFID reader 1 communicates with the RFID tag 2 in a contactless manner via modulated electromagnetic signals, provided that the RFID tag 2 is within the transmitting and receiving range of the RFID reader 1.

The RFID reader 1 comprises control means 3, like a microprocessor or microcontroller, which control means 3 communicate via a data bus with program storage means 4. The program storage means 4 are adapted to store an operating system OS for basic operation of the control means 3 and application program code SW to be processed by the control means 3. The control means 3 and the program storage means 4 may be integrated into a single chip. It should be observed that the application program code SW and the operating system OS may be integrated into a single program. The control means 3 further communicate with a random access memory 5. The control means 3, when processing the program code SW, cooperate with input/output means 8, which e.g. can be configured as a link interface to a computer. The control means 3 further communicate with radio frequency communication means 6 which are connected to an antenna 7 (e.g. a loop antenna, as shown, or a dipole antenna, etc.) for transmitting electromagnetic signals SS to the RFID tag 2. These electromagnetic signals SS may be used for both transmitting data to the RFID tags 2, thereby establishing a forward link FL, and energizing the RFID tag 2 which is configured as a passive tag. The RFID tag 2 responds to the RFID reader 1 with backscattering signals BS, thereby establishing a return link RL. Data exchange between the RFID reader 1 and the RFID tag 2 may be accomplished by standard data transmission protocols and standard modulation methods. For instance, the electromagnetic signal SS sent from the RFID reader 1 to the RFID tag 2 is configured as a pulse-width modulated signal. The backscattering signals BS from the RFID tag 2 to the RFID reader 1 are e.g. load modulated signals, wherein a carrier signal or subcarrier signal contained in the electromagnetic signal SS is modulated by switching a load impedance connected to the antenna 10 of the RFID tag 2, so that varying energy is drawn from the carrier signal or subcarrier signal. Switching the load impedances at the RFID tag 2 causes a change of the impedance of the antenna 7 of the RFID reader 1 and hence a varying amplitude of the voltage at the antenna 7 of the RFID reader 1, which varying voltage amplitude represents an input signal IS to the radio frequency communication means 6. For recovery of data contained in the input signal IS the input signal IS is rectified or demodulated by the radio frequency communication means 6, yielding data stream signal DS. The control means 3 extract the data coded in the data stream signal DS, e.g. by comparing it with defined bit levels.

The RFID tag 2 is configured as a passive tag and comprises an antenna 10, an analog radio frequency interface 11 that is connected to the antenna 10, a digital control unit 12 that is connected to the analog radio frequency interface 11, and a memory 13 that is connected to the digital control unit 12. The memory 13 is a non-volatile memory, such as an EEPROM, so that data that are written into the memory 13 during communication with the RFID reader 1 remain stored even when the RFID tag 2 is switched off, e.g. because it leaves the transmitting range of the RFID reader 1 and is therefore no longer energized by the RFID reader 1. Memory 13 may also contain a program code for operating the digital control unit 12 and a unique identification number. Antenna 10 receives the electromagnetic signals SS from the RFID reader 1 and passes them to the analog radio frequency interface 11. In general, the analog radio frequency interface 11 comprises a rectifier RECT and a voltage regulator VREG with integrated energy storage element, like a capacitor, to derive from the received electromagnetic signals SS the necessary operating voltage VDD for the digital control unit 12 and the memory 13. Further, analogue radio frequency interface 11 comprises a demodulator DEMOD to extract data DIN from the electromagnetic signals SS and to pass them to the digital control unit 12. Digital control unit 12 processes the received data DIN and may respond to the RFID reader 1 by creating output data DOUT and passing them to the analogue radio frequency interface 11. Analogue radio frequency interface 11 comprises a modulator MOD that modulates the output data DOUT and transmits the modulated signals as backscattering signals BS via antenna 10.

Figure 2:
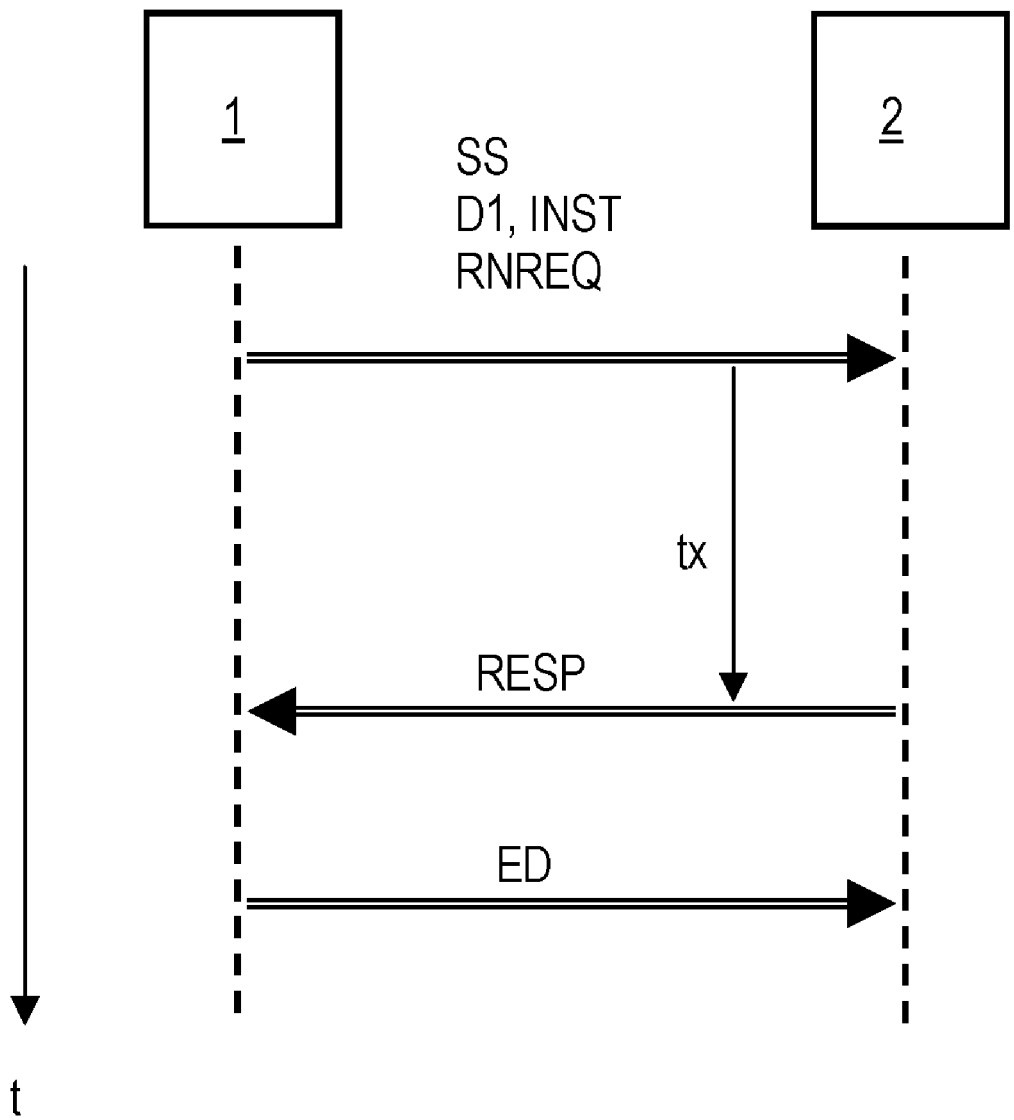
FIG. 2 shows a timing diagram illustrating the method of establishing a secure two-way communication link between a reader and a tag according to the present invention.

As hitherto described, the RFID reader and the RFID tag are known in the art. In the following, an exemplary implementation of the present invention in these devices is described, providing a highly secure wireless communication between the reader 1 and the tag 2. Reference is now made to both FIG. 1 and FIG. 2 showing a timing diagram that illustrates the method of establishing a secure two-way communication link between the reader 1 and the tag 2 according to the present invention.

At the beginning of the inventive method the reader starts with either switching on an electromagnetic signal SS, which is able to energize the tag 2 with electric energy, or with transmitting an instruction INST or first data D1 to the tag 2.

The instruction INST can either be a general instruction or a specific instruction RNREQ requesting the tag 2 to send a random number RN to be used in the reader 1 as a key for encrypting sensitive data that have to be sent subsequently from the reader 1 to the tag 2. The tag 2 comprises a pseudo-random number generator 14 that generates random numbers RN autonomously. The tag 2 further comprises a random time generator 15 that converts the random number RN into a random time period tx, e.g. either by multiplying the random number RN by a predefined time unit TU or by looking up in a table 16 that contains a list of pairs of random numbers and associated random time periods. Both the pseudo-random number generator 14 and the random time generator 15 are controlled by the digital control unit 12 or may form parts of it. The digital control unit 12 comprises time delaying means such as a counter 21. When the instructions INST or RNREQ or the first data D1 are received from the reader 1 the digital control unit 12 loads the calculated random time period tx as a digital value into the counter 21 and enables the counter 21 to count down from the loaded random time period tx to zero with a predefined counting frequency. When zero is reached, the counter 21 triggers transmitting a response RESP to the reader 1. In respect of the time at which the instructions INST or RNREQ or the first data D1 have been received by the tag 2, this response RESP is delayed by the random time period tx plus a known internal processing time needed for generating the random time period tx. It should be noticed, that the counter 21 may replace the random time generator 15 by loading the random number RN directly wherein counting down to zero with a predefined counting frequency (that corresponds to the reciprocal of the time unit TU) automatically yields the random time period tx.

In a variation of the above described embodiment of the tag 2, the tag 2 does not wait for receiving an instruction from the reader 1, but immediately starts with calculating the random number RN and the random time period tx derived from the random number when being energized by the electromagnetic signal SS that is transmitted by the reader 1. In this variation of the tag 2, the random time period tx is the time period between energizing the tag 2 and transmitting the response RESP.

It is preferred that a generated random number RN is only used once, i.e. in the manner of a one-time pad. This can be achieved by either:

a) continuously generating random numbers RN, wherein the most recent one replaces all former random numbers RN; or b) generating one random number RN each time when data D1 or instructions INST are received; or c) generating a random number RN only if a specific instruction RNREQ is received.

The reader 1 comprises time measuring means 18 (like a counter) that are triggered either at the moment when the electromagnetic signal SS is switched on, or at the moment when the instruction INST, RNREQ or the first data D1 are transmitted to the tag 2. The time measuring means 18 are halted when the response RESP is received from the tag 2 and the time period that has elapsed since the electromagnetic signal SS has been switched on, or since the instruction INST, RNREQ or the first data D1 have been transmitted is read out from time measuring means 18. This read-out time period essentially corresponds to the random time period tx. The random time period tx is then reconverted into the random number RN by reconverting means 19, e.g. either by dividing the random time period tx by a predefined time unit TU or by looking up for the random number RN in a table 16 that contains random time periods tx and associated random numbers RN wherein the table 16 is the same as that used in the tag 2.

It should be noted that the time measuring means 18 when being configured as a counter may additionally function as the reconverting means provided that the counting frequency is the reciprocal of the time unit TU. If this condition is met, then the counting result is the random number RN.

For the further operation of the reader 1 the random number RN is used as a key for encrypting second data D2. In order to accomplish encryption, the reader 1 comprises encrypting means 20 to which both the random number RN and the second data D2 are fed. The second data D2 are encrypted to encrypted data ED with the key, for instance by an exclusive-or (EXOR) operation, as will be explained by the following example for an 8 bit word:

| | |
|---|---|
| second data D2: | 11100100 |
| random number RN: | 01000110 |
| encrypted data ED: | 10100010 (EXOR) |

In the present embodiment of the invention, the time measuring means 18, the reconverting means 19 and the encrypting means 20 are controlled by the control means 3, or may form parts thereof.

The encrypted data ED are transmitted to the tag 2. The tag 2 comprises decrypting means 17 that extract from the received encrypted data ED the second data D2 by the use of the random number RN (which is known to the tag 2 because it has generated it) and applying an operation, corresponding to the operation in the encrypting means 20 of the reader, e.g. an EXOR operation:

| | |
|---|---|
| encrypted data D2: | 10100010 |
| random number RN: | 01000110 |
| second data D2: | 11100100 (EXOR) |

An eavesdropper who positions a receiver 22 within the ranges of the forward link FL and the return link RL will be able to receive the second data D2, but he will not be able to intercept them since they are transmitted in an encrypted manner, nor will he be able to measure the random time period tx between transmission of the instructions INST or RNREQ or the first data D1 and the response RESP. As has been explained above, the reason for this is the huge difference in the signal strengths of the forward link FL and the return link RL of 100 dB and more, which inevitably causes distortions of the signals received by the receiver 22, wherein the distortions hinder the eavesdropper to carry out exact time measurements.

It is to be understood that the present invention is not limited to passive tags, but with the same advantages is also applicable to battery-assisted tags.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method for communicating securely between a reader and at least one tag in an RFID system, the method comprising:
    switching, at the reader, on an electromagnetic signal for energizing the RFID tag and/or transmitting an instruction or first data to the tag;
    generating, at the tag, a random number, converting said random number into a random time period and, transmitting a response to the reader after a delay time that corresponds to the random time period;
    measuring, at the reader, the time period between said switching on of the electromagnetic signal or said transmitting of an instruction or first data to the tag and receiving of the response from the tag, which time period corresponds to the random time period, reconverting the measured random time period into the random number, encrypting second data to be sent to the tag by the use of the random number and transmitting said encrypted data to the tag;
    at the tag, decrypting the received encrypted data by the use of the random number.

2. A method as claimed in claim 1, wherein the random number is generated at the tag by the use of a pseudo-random number generator.

3. A method as claimed in claim 1, wherein the tag delays a response to the reader by the random time period only if it receives a specific instruction from the reader.

4. A method as claimed in claim 1, wherein the tag delays each response to the reader by a random time period that is newly calculated for each response.

5. A method as claimed in claim 1, wherein converting the random number into a random time period and reconverting the random time period into the random number comprises multiplying the random number by a predefined time unit and dividing the random time period by the predefined time unit, respectively.

6. A method as claimed in claim 1, wherein converting the random number into a random time period and reconverting the random time period into the random number comprises looking-up in a table that contains pairs of random numbers and associated random time periods.

7. A method as claimed in claim 1, wherein the tag generates random numbers independently of receiving an instruction or first data from the reader.

8. A method of reading an RFID tag by an RFID reader, the method comprising:
    switching on an electromagnetic signal for energizing an RFID tag and/or transmitting an instruction or first data to an RFID tag;
    measuring the time period between said switching on of the electromagnetic signal or said transmitting of an instruction or first data to the tag and receiving of a response from the tag, wherein the measured time period corresponds to a random time period;
    reconverting the measured random time period into a random number;
    encrypting second data to be sent to the tag by the use of the random number;
    and transmitting said encrypted data to the tag.

9. The method of claim 8, wherein reconverting the random time period into the random number comprises dividing the random time period by a predefined time unit.

10. The method of claim 8, wherein reconverting the random time period into the random number comprises looking-up in a table that contains pairs of random time periods and associated random numbers.

11. A method of communicating securely between an RFID reader and an RFID tag, the method comprising:
    generating a random number;
    converting said random number into a random time period, upon being energized by an electromagnetic signal or upon receiving an instruction or first data from an RFID reader;
    transmitting a response to the reader after a delay time that corresponds to the random time period;
    and decrypting received encrypted data by the use of the random number.

12. The method of claim 11, wherein the random number is generated at the tag by the use of a pseudo-random number generator.

13. The method of claim 11, wherein the tag delays the response to the reader by the random time period only if it receives a specific instruction from the reader.

14. The method of claim 11, wherein the tag delays each response to the reader by a random time period that is newly calculated for each response.

15. The method of claim 11, wherein converting the random number into a random time period comprises multiplying the random number by a predefined time unit.

16. The method of claim 11, wherein converting the random number into a random time period comprises looking-up in a table that contains pairs of random numbers and associated random time periods.

17. The method of claim 11, wherein the tag generates random numbers independently of receiving an instruction or first data from the reader.

* * * * *